3,003,981
EPOXIDIZED POLYENE POLYMERS
Robert L. Wear, West St. Paul, Minn., assignor to Minnesota Mining & Manufacturing Company, St. Paul, Minn., a corporation of Delaware
No Drawing. Filed Jan. 9, 1956, Ser. No. 573,579
8 Claims. (Cl. 260—24)

This invention relates to epoxy resins, i.e., to resinous or resin-forming compounds containing epoxy or oxirane linkages, and has particular reference to low-cost epoxy resins formed from low priced and readily available raw materials by simple and economical processes. The invention particularly relates to polymeric epoxy resin materials in which the oxirane oxygen atoms are attached at intervals along a polymeric skeletal chain formed exclusively of carbon atoms. The invention also relates to cured resinuous articles and components prepared from these epoxy resin materials.

The heat-curable products of this invention are to be distinguished from typical prior art epoxy resins such as the resinous glycidyl polyethers obtained from epichlorhydrin and bisphenol or equivalent reactants, and which are appropriately represented by the following general formula

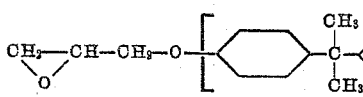 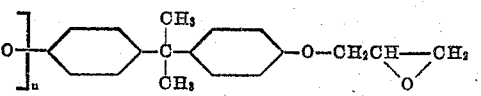

where $n$ has an average value between zero and about seven. Somewhat analogous prior art epoxy resins may be prepared from epichlorhydrin and glycerol. In all of these resins the skeletal chain will be seen to contain ether linkages.

Epichlorhydrin is expensive and the chlorine content is unavoidably lost during these prior art resin-forming reactions. By products, e.g., sodium chloride, which are formed in the reactions must be eliminated. The epoxy polyether resins may be cured by reaction with organic acid anhydrides, various alkaline materials, etc. to form useful resinous articles and components. However, epoxy resins prepared from bisphenol have a tendency toward brittleness, and while those prepared from glycerol are more flexible, they are somewhat weak.

Another class of prior art epoxy materials consists of epoxidized oils such as epoxidized soybean oil. This material is a triglyceride of long chain fatty acids containing oxirane oxygen. The skeletal chain thus contains ester linkages. These polyester epoxy resins are less expensive than the epoxy resin materials just discussed, but on the other hand cannot without modification be cured to useful end products and are of importance mainly as additives for other resins or resin systems.

The present invention provides epoxy resin materials containing no ether or ester oxygen atoms in the skeletal carbon chain. The resins are formed from cheap and readily available raw materials, and by a simple and economical process. A wide variety of raw materials may be employed. The resins may themselves be cured in admixture with a chemical hardening agent for epoxy polyether resin to form a variety of useful objects ranging from highly flexible, rubbery materials to hard, tough, thermoset articles having improved resistance to mechanical shock. The novel resins may alternatively be added to conventional prior art epoxy resin formulations, where they produce homogeneous cured products of improved toughness and shock resistance. Since the resinous products are high in electrical resistance and other desired electrical qualities, the resinous compositions of this invention are useful in the encapsulation of electrical components, in the formulation of electrically resistant films and coatings, and in various other ways.

The following examples will serve to illustrate the preparation of various modifications of the epoxy resins of this invention and the application of these resins to a number of specific uses, but are not to be construed as limitative.

*Example I*

Into a 500 milliliter flask equipped with an air-powered stirrer, dropping funnel, reflux condenser and thermometer were placed 40.8 grams of depolymerized rubber, 35 milliliters of carbon tetrachloride, and 4 milliliters of 90 percent formic acid. From its probable formula, it was calculated that the depolymerized rubber had one double bond per formula weight of about 68, that is, an unsaturation equivalent weight of about 68. The depolymerized rubber was a highly viscous semi-liquid having an average molecular weight of about 40,000 such as is obtainable by pyrolysis of natural rubber. With stirring, 44 grams of 35 percent hydrogen peroxide (0.45 mole) was added dropwise over a period of 30 minutes. Stirring was continued for 10 hours, during which time occasional cooling was required to keep the temperature below 40° C. The reaction mixture was then neutralized with aqueous sodium bicarbonate. The carbon tetrachloride was removed by steam distillation, and the rubbery product was washed with water and dried in a vacuum. The product was a tacky, stretchy rubber which was considerably more solid and elastic than the starting material. Analysis showed the product to include 6.1 percent oxirane oxygen; it had an epoxide equivalent weight of about 270.

A 5.5 gram sample of this rubbery product was mixed with 4.1 grams of hexenyl succinic anhydride, which anhydride is a liquid at room temperatures and is prepared by heating together equimolar proportions of maleic anhydride and an olefin having a carbon chain of six atoms, the olefin adding to the maleic anhydride at its double bond. Mixing was continued on a steam bath to attain a flowable liquid solution after which eight drops of triethyl amine were added. The mixture was cured for one hour at 100° C. followed by 1½ hours at 125° C. to yield a solid, flexible, fairly tough casting containing tiny bubbles, probably due to water in the epoxidized depolymerized rubber.

*Example II*

Another batch of epoxidized depolymerized rubber was prepared following generally the procedure outlined in Example I except that the product was dried in an oven at 120° C. for several hours. It contained 5.3 percent oxirane oxygen.

A liquid mixture of 6.6 grams of this product, 4.4 grams of hexenyl succinic anhydride, and 0.07 gram of triethyl amine was cured for one hour at 100° C. followed by 2½ hours at 120° C. A flexible, soft, yet tough, bubble-free resinous product was obtained. A film cast from this liquid mixture and cured for 2½ hours at 120° C. was very flexible and yet strong and tough. The film showed some extensibility.

*Example III*

A sample of the oven-dried product of the preceding example, 1.6 grams, was mixed with 6.4 grams of an epoxy resin prepared from epichlorhydrin and bisphenol A at a mole ratio of approximately 10 to 1 and having a melting point of about 10° C. as determined by the Durrans Mercury Method and an epoxide equivalent weight of about 200. To this mixture was added 7.0 grams of hexenyl succinic anhydride as curing agent and 0.1 gram of dimethylbenzyl amine as catalyst, and a casting prepared therefrom was cured for one hour at 120° C. A hard, strong, homogeneous casting was obtained having good flexibility, whereas castings prepared using the same hardening agents with the epichlorhydrin-bisphenol type epoxy resin alone are rather brittle.

*Example IV*

| | |
|---|---|
| Liquid polybutadiene (2 equiv.)grams | 108 |
| 35% hydrogen peroxide (0.9 mole)do | 90 |
| 90% formic acid (0.27 mole)do | 13 |
| Carbon tetrachlorideml | 60 |

The foregoing ingredients were reacted in the same manner as in Example I except that the addition of the hydrogen peroxide required 35 minutes during which time the temperature rose from 23° to 30° C. The temperature increased slowly to 40° C. and then dropped off to 37° C. after five hours. Heat was applied to hold the temperature between 37° and 40° for the next three hours, total stirring time being eight hours. The mixture was washed with four 100 milliliter portions of water by stirring and decantation. The carbon tetrachloride was removed by steam distillation, the water decanted, and the residue dehydrated at reduced pressure. The product was a very soft solid without any rubberiness or toughness and was analyzed to show a 4.6 percent oxirane oxygen content corresponding to an epoxide equivalent weight of about 350. The average molecular weight of the product was about 1500.

Seven grams of this product were mixed with 2.4 grams octenyl succinic anhydride, 0.8 gram maleic anhydride, and 0.05 gram dimethylbenzyl amine. The mixture was cured for three hours at 120° C. to a hard, tough, and somewhat flexible casting.

Octenyl succinic anhydride is a normally liquid reaction product of equimolar proportions of octene and maleic anhydride.

*Example V*

Liquid polybutadiene of about 1500 average molecular weight was epoxidized in a manner similar to the procedure followed in the preceding example except that a higher percentage of hydrogen peroxide was used in the reaction mixture and the steps of stirring and steam distillation were continued for an appreciably longer period. The epoxidized polybutadiene thus prepared contained about 5.3 percent oxirane oxygen and was soft, tacky, somewhat tough, and to some degree extensible as compared to the non-rubbery epoxidized polybutadiene obtained in Example IV.

The epoxidized product, in the amount of 7.7 grams, was mixed while hot with 0.8 gram of diethylene triamine. The mixture became quite viscous. It cured in 3 hours at 120° C. to a flexible but rather tough casting.

*Example VI*

A casting was prepared from a mixture of 30 grams of the epoxidized liquid polybutadiene of the preceding example, 20 grams of octenyl succinic anhydride, and 0.4 gram of dimethylbenzyl amine. After curing for 5½ hours at 120° C., a hard but non-brittle and somewhat flexible casting was obtained which was tested for electrical purposes. The data shown in Table A were obtained at room temperature.

TABLE A

| Frequency | 60 cycles | 1 kc. | 1 mc. |
|---|---|---|---|
| Dissipation Factor | .026 | .019 | .012 |
| Dielectric Constant | 3.2 | 3.1 | 2.8 |

The values given in Table A indicate that this cured resin is a good electrical insulator and has electrical insulating properties approximately equal to the cured products of epoxy polyether resins, which resins are recognized in the art as good electrical insulators. In view of the low cost of the thermosetting compositions of this invention and the toughness, flexibility and electrical insulating properties of the cured products thereof, the compositions are particularly useful for encapsulating electrical components or the like which are to be subjected to mechanical shock or vibration.

*Example VII*

A thermosetting mixture was prepared using a sample of the epoxidized liquid polybutadiene obtained in Example V and an aliphatic type epoxy polyether resin in the following proportions:

| | Grams |
|---|---|
| Epoxidized liquid polybutadiene | 6.7 |
| Epoxy polyether resin | 3.0 |
| Octenyl succinic anhydride | 8.5 |
| Dimethylbenzyl amine | 0.1 |

The mixture was cured for three hours at 120° C. to a hard, flexible, and very tough resinous casting.

The aliphatic epoxy polyether resin was made by reacting epichlorhydrin with glycerol. The particular resin used was the liquid "Epon" No. 1062, by change of designation now "Epon" No. 562, which is believed to be made by reacting 3 moles of epichlorhydrin with one mole of glycerol in ethereal solution with a boron trifluoride catalyst, dissolving this product and a quantity of sodium aluminate in dioxane, agitating the solution at an elevated temperature, filtering out inorganic material, and heating to remove low boiling point components.

*Example VIII*

Epoxidized polybutadiene was prepared by the general procedure outlined in Example IV except that the relative amounts of hydrogen peroxide and formic acid used in the reaction mixture were exactly cut in half. The epoxidized polymer obtained as a reaction product had only 2.4 percent oxirane oxygen.

A mixture of 19 grams of the epoxidized polybutadiene, 3.2 grams of 2,2-bis(4-hydroxyphenyl)propane, i.e., bisphenol A, and 0.1 gram of pyridine was heated with stirring at about 120° C. for 1½ hours in which time the polymer was changed from a viscous liquid to a rubbery solid. Other alkaline catalysts may be substituted for the pyridine to effect reaction between bisphenol and an epoxidized polyene polymer.

Eleven grams of this rubbery product mixed with four grams of tetrapropenyl succinic anhydride and 0.1 gram of dimethylbenzyl amine were cured in ten hours at 120° C. to a flexible, tough casting. Tetrapropenyl succinic anhydride is a reaction product of equimolar proportions of maleic anhydride and the tetramer of propylene and is a liquid at room temperature.

*Example IX*

| | |
|---|---|
| Liquid butadiene/acrylonitrile copolymergrams | 50 |
| 35% Hydrogen peroxidedo | 40 |
| 90% Formic aciddo | 6 |
| Carbon tetrachlorideml | 40 |

The butadiene/acrylonitrile copolymer used in this example was prepared from 55 parts butadiene and 45 parts acrylonitrile and had an intrinsic viscosity of 0.12. The average molecular weight of the copolymer was estimated from the intrinsic viscosity to be about 8,000. It was reacted in the above proportions by the procedure outlined in Example I except that the stirring was continued for a total of 19 hours, at the end of which time the reaction temperature had dropped to 27° C. The product was washed several times with water, steam distilled, and dried under a vacuum at about 50° C. The product was a fairly hard, tough solid having an oxirane oxygen content of about 2.8 percent.

Four parts of this product were blended with two parts of tetrapropenyl succinic anhydride and 0.5 percent of dimethylbenzyl amine. The blend was cured to a flexible and very tough material after heating overnight at 120° C.

Another sample of the epoxidized copolymer was dissolved in methyl isobutyl ketone to give an opaque solution. Films obtained by curing with tetrapropenyl succinic anhydride and dimethylbenzyl amine were flexible and reasonably tough.

*Example X*

Using apparatus as in Example I, 100 grams of a 47.6 percent solids solution in benzene of a butadiene/acrylic acid copolymer, having an unsaturation equivalent weight of about 200 as calculated from its probable formula and an intrinsic viscosity of about 0.23, were mixed with 3.8 grams of 90 percent formic acid; and 25 grams of 35 percent hydrogen peroxide were added dropwise with stirring over a period of 15 minutes. After stirring a total of 21 hours, during which time the temperature of the mixture varied between 25° and 30° C., 100 milliliters of methyl isobutyl ketone were added followed by 6.3 grams of sodium bicarbonate to neutralize the formic acid. The reaction mixture was refluxed to remove water, and about 25 milliliters of water were collected. The resulting solution was concentrated by heating to 50° C. under 20 millimeters pressure, and analysis showed it comprised 1.6 percent oxirane oxygen which, calculated on the solid basis, amounted to 2.9 percent oxirane oxygen.

After thinning with toluene, this epoxidized butadiene/acrylic acid copolymer was coated on an aluminum panel and cured, upon drying in air at normal room temperatures, to a non-flowing, snappy, rubbery film which was well adhered to the aluminum panel. Although the film was tacky to the touch, it did not transfer to the fingers. By way of contrast, the butadiene/acrylic acid copolymer dries to a flowable but rather viscous liquid which shows no evidence of elasticity.

This tacky quality is desirable in various connections, e.g., in making adhesives. The degree of tackiness can be increased by compounding with compatible tackifiers, such as pentaerythritol ester of rosin. Such adhesives have value in making normally tacky, pressure-sensitive adhesive tapes, the adhesive being coated upon a desired flexible backing. A particularly interesting adhesive tape may be made by coating the adhesive on thin, flexible aluminum foil.

*Example XI*

Four parts by weight of liquid polybutadiene were mixed with one part of chloromaleic anhydride and the temperature was raised to 130° C. with continued agitation and held at 130° C. for four hours.

The reaction product, a free flowing liquid at room temperature, was mixed at room temperature with epoxidized polybutadiene, comprising about five percent by weight of oxirane oxygen, in the ratio of one part of the anhydride reaction product to four parts by weight of the epoxidized polybutadiene. After standing at room temperature from 24 to 48 hours, castings were obtained possessing fair tensile strength, excellent shock resistance and good stretchability.

ASTM procedure D–471–49T, method B, was followed in testing the castings for oil resistance. The percentage volume swells noted in various solvents were:

| | Percent |
|---|---|
| 70:30 iso-octane:toluene mixture | 86 |
| Benzene | 154 |
| Acetone | 76 |
| Iso-octane | 52 |

After 72 hours at 100° C. in ASTM #1 oil, a 2 percent volume swell was realized.

These values indicate that the material has an oil resistance in the range of so-called oil-resistant rubbers and is better than many rubbers commercially used for such purpose.

This and similar compositions have been used to encapsulate various articles including metals and glass and have proved to be capable of withstanding the stresses which occur due to differences in expansion or contraction of the various materials. The compositions also show considerable utility in casting intricately shaped rubbery objects at room or slightly elevated temperatures and as sealants for aircraft, automotive, marine, and electrical applications.

Many variations in the ingredients and preparation of the novel epoxy resins and in uses of the cured products thereof will be obvious to those skilled in the art. For example, the novel epoxy resins may be created by the epoxidation of any polymer containing a sufficient number of double bonds to provide, after epoxidation, more than one oxirane group per average molecular weight, through which groups the resin can be cross-linked by a chemical hardening agent for epoxy polyether resin to provide useful cured products. It is not essential that the polymeric skeletal chain be formed exclusively of carbon atoms as long as the introduction of occasional other atoms does not substantially alter the character of the resin. However, the epoxy resins having carbon atoms exclusively in their skeletal chain are preferred in that they can be prepared by simple and economical procedures from low cost materials of unlimited availability, e.g., from polymers of monomers including conjugated diolefin. The term polymer is meant to include both homopolymers and copolymers. The polymers are preferably of low molecular weight but not less than about 1500. Polymers of high molecular weight are often hard to get into solution. The solutions thus produced are undesirably viscous, even at low concentrations, and accordingly are difficult to epoxidize. The preference for lower weight polymers also stems from the fact that the epoxidized products thereof allow the realization of thermosetting compositions of low viscosity and free from volatile components, which compositions will thoroughly saturate and impregnate porous and complex articles and can be cured to homogeneous, bubble-free resinous articles.

Low viscosity in a thermosetting composition also allows the composition to be mixed with large percentages of finely divided inert fillers without destroying its usefulness as a casting or potting composition. Particularly useful as curing agents for the novel epoxy resins where low viscosities are desired are the alkenyl succinic anhydrides.

Among other polymers which may be epoxidized and then cured to provide products similar to those obtained in the foregoing examples are polychloroprene, copolymers of butadiene and styrene, and copolymers of butadiene and isobutylene. The first of these, however, is epoxidized with difficulty and so has limited commercial utility.

What is claimed is:

1. A composition of matter, capable of curing when heated to a tough, flexible, resinous article, comprising a mixture of (1) a soluble polymeric product which has an average molecular weight of about 1500 to 40,000, a polymeric open chain consisting substantially exclusively of carbon atoms, on the average more than one oxirane oxygen atom attached to said open chain, and an oxirane oxygen content of up to about 6% by weight, and (2) a hardening amount of alkenyl succinic anhydride.

2. A tough, flexible, resinous cured product of a composition of matter as defined in claim 1.

3. A resin-encapsulated article having as the resinous covering a heat-cured reaction product of a composition of matter as defined in claim 1.

4. A composition of matter, capable of curing when heated in admixture with a polyfunctional chemical hardening agent for epoxy polyether resin, to a tough, flexible, resinous article, comprising a mixture of (1) one part by weight of a soluble polymeric product which has an average molecular weight of about 1500 to 40,000 a polymeric open chain consisting substantially exclusively of carbon atoms, on the average more than one oxirane oxygen atom attached to said open chain, and an oxirane oxygen content of up to about 6% by weight, and (2) about 1/3 to 4 parts of an epoxy polyether resin having more than one oxirane group per average molecular weight.

5. A tough, flexible, resinous, heat-cured reaction product of a mixture of the composition of matter defined in claim 4 and a polyfunctional chemical hardening agent for epoxy polyether resin selected from the group consisting of polycarboxylic acid anhydride and polyfunctional amine.

6. A composition of matter, capable of curing when heated in an alkaline medium in admixture with a polyfunctional chemical hardening agent for epoxy polyether resin, to a tough, flexible, resinous article, comprising a mixture of (1) about six parts by weight of a soluble polymeric product which has an average molecular weight of about 1500 to 40,000, a polymeric open chain consisting substantially exclusively of carbon atoms, on the average more than one oxirane oxygen atom attached to said open chain, and an oxirane oxygen content of up to about 6% by weight, and (2) one part of 2,2-bis(4-hydroxyphenyl)propane.

7. The tough, flexible, resinous, heat-cured reaction product of a mixture of the composition of matter defined in claim 6 and a polyfunctional chemical hardening agent for epoxy polyether resin selected from the group consisting of polycarboxylic acid anhydride and polyfunctional amine.

8. An article having a surface and, adherently bonded thereto, a tacky rubbery film comprised of the cured product of a mixture of (1) a soluble polymer which has an average molecular weight of about 1500 to 40,000, a polymeric open chain consisting substantially exclusively of carbon atoms, on the average more than one oxirane oxygen atom attached to said open chain, and an oxirane oxygen content of up to about 6% by weight, and (2) a tackifying amount of pentaerythritol ester of rosin.

References Cited in the file of this patent
UNITED STATES PATENTS

| | | |
|---|---|---|
| 1,988,448 | Hopff et al. | Jan. 22, 1935 |
| 2,569,920 | Buck et al. | Oct. 2, 1951 |
| 2,615,008 | Greenlee | Oct. 21, 1952 |
| 2,660,563 | Banes et al. | Nov. 24, 1953 |
| 2,767,157 | Masters | Oct. 16, 1956 |
| 2,826,556 | Greenspan et al. | Mar. 11, 1958 |
| 2,833,747 | Greenspan et al. | May 6, 1958 |